(12) United States Patent
Braun et al.

(10) Patent No.: US 11,183,899 B2
(45) Date of Patent: Nov. 23, 2021

(54) STATOR FOR AN ELECTRIC MACHINE, AN ELECTRIC MACHINE AND METHOD FOR MANUFACTURING SUCH AN ELECTRIC MACHINE

(71) Applicant: Robert Bosch GmbH, Stuttgart (DE)

(72) Inventors: Konstantin Braun, Rastatt (DE); Peter Szalay, Stutensee (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 16/543,863

(22) Filed: Aug. 19, 2019

(65) Prior Publication Data

US 2020/0067367 A1    Feb. 27, 2020

(30) Foreign Application Priority Data

Aug. 21, 2018  (DE) .......................... 102018214111.8

(51) Int. Cl.
| | |
|---|---|
| H02K 3/52 | (2006.01) |
| H01R 25/00 | (2006.01) |
| H02K 1/14 | (2006.01) |
| H02K 15/02 | (2006.01) |
| H02K 15/00 | (2006.01) |
| H02K 3/38 | (2006.01) |
| H01R 105/00 | (2006.01) |

(52) U.S. Cl.
CPC ............ *H02K 3/522* (2013.01); *H01R 25/006* (2013.01); *H02K 1/146* (2013.01); *H02K 3/38* (2013.01); *H02K 15/0062* (2013.01); *H02K 15/022* (2013.01); *H01R 2105/00* (2013.01); *H01R 2201/10* (2013.01)

(58) Field of Classification Search
CPC ........ H02K 3/28; H02K 3/50; H02K 2203/06; H02K 2203/09
USPC ........................................... 310/216.005, 416
See application file for complete search history.

(56) References Cited

U.S. PATENT DOCUMENTS

| | | |
|---|---|---|
| 2015/0364955 A1 | 12/2015 | Aumann |
| 2020/0220412 A1* | 7/2020 | Iwano ...................... H02K 3/50 |

FOREIGN PATENT DOCUMENTS

| | | |
|---|---|---|
| DE | 10345060 A1 | 4/2005 |
| DE | 102008054529 A1 | 6/2010 |
| DE | 102012224153 | 6/2014 |

(Continued)

*Primary Examiner* — Quyen P Leung
*Assistant Examiner* — Minki Chang
(74) *Attorney, Agent, or Firm* — Michael Best & Friedrich LLP (57) ABSTRACT

Stator (10), electric machine (9), and method for manufacturing an electric machine (9), with a stator base body (34), which comprises radial stator teeth (14) for receiving an electric winding (20), wherein the electric winding (20) is connected to a separately manufactured connection plate (52), which comprises contacting modules (60) for the energizing of individual phases (U, V, W) of the electric winding (20), wherein electric conductor elements (54) are arranged in a radial plane of the stator (10) on the connection plate (52), which, on the one hand, are connected to winding wires (22) of the electric winding (20) and, on the other hand, carry the contacting modules (60), wherein the conductor elements (54) comprise a plurality of angled portions (56) within the radial plane, which make a spring-loaded compensation movement of the contacting modules (60) in the radial plane possible.

25 Claims, 4 Drawing Sheets

(56) References Cited

FOREIGN PATENT DOCUMENTS

DE  102013106999 A1  1/2015
WO  2011104763 A1  9/2011

* cited by examiner

STATOR FOR AN ELECTRIC MACHINE, AN ELECTRIC MACHINE AND METHOD FOR MANUFACTURING SUCH AN ELECTRIC MACHINE

BACKGROUND OF THE INVENTION

The invention relates to a stator for an electric machine as well as to an electric machine and to a method for manufacturing an electric machine.

DE 10 2012 224 153 A1 has disclosed a stator of an electric machine in which an insulating lamella, a support plate and a connection plate are arranged axially on a lamella package. The stator is, for example, wound by means of needle windings, wherein the individual coil sections are connected to each other by means of connection wires on the outer circumference of the support plate. Thereby, the entire winding is wound through in one piece by means of a single winding wire. Since the connection wires between the individual coils are arranged axially on top of each other, the axial overall height of the stator is relatively high. In addition, the effort required to weld the connection plate to the connection wires is very costly. These disadvantages should be remedied by means of the solution according to the invention.

SUMMARY OF THE INVENTION

In contrast, the device according to the invention and the method according to the invention have the advantage that the contacting modules attached to the conductor elements are movably arranged within certain limits due to the spring-elastic design of the conductor elements within the plane transverse to the stator axis. This allows for manufacturing and assembly tolerances to be compensated for when inserting contact plugs of the electronics unit into the contacting modules. As a result, the contacting modules are automatically centered in the radial plane transverse to the stator axis when the electronic plugs are inserted axially. The elastic compensation movement of the contacting modules in this radial plane is implemented by the spring-elastic conductor elements, which have a plurality of bends within the radial plane, the limbs of which can be pressed together or pulled out by means of a spring action. As a result, the conductor elements in the radial plane act as elastic spring elements that are firmly connected to the contacting modules due to the selected conductor cross-section.

So that the contacting modules in the radial plane can be moved transverse to the stator axis, the contacting modules are not directly connected to the base body of the connection plate, but only via the elastically formed conductor elements. Thus, the contacting modules can shift with the elastic deformation of the conductor elements opposite the annular base surface of the connection plate in order to be centered against the plug contacts of the electronics unit. When contacting the contacting modules, thereby, axial forces acting thereon can be absorbed by the base body of the connection plate, on which the contact modules are axially supported. Thereby, the contacting modules in the axially unburdened state are arranged either slightly spaced apart from the surface of the base body, or lie, in particular, directly on this base surface.

The contacting modules are in this case particularly favorably made of plastic, in particular, as an injection-molded part, wherein the electrically conductive conductor elements are arranged within the contacting modules in order to electrically contact the plugs of the electronics unit.

In a preferred embodiment, the contacting modules comprise plastic plug sockets, into which the contact elements of the electronics unit axially engage. For example, in a single contacting module, three adjacent plug sockets are connected to each other in order to energize three different phases of the coil windings. In the case of such an embodiment of the contacting modules with plug sockets, the corresponding connector plugs of the electronics unit can extend into the plug sockets in the axial direction as an insulation-displacement connection (IDC connector) made of metal.

In terms of manufacturing, the conductor elements can be manufactured particularly easily as bent/punched parts made of metal, wherein the metal can be optimized in terms of its electric conductivity and its spring-elastic characteristics. For example, copper alloys can be used for this purpose. The conductor elements are herein connected to the contacting modules in such a way that electric contact bars are punched out inside the plug collars, which are electrically contacted directly with the plug pins of the electronics unit. For example, the conductor elements can be overmolded herein with the contacting modules in such a way that portions of the conductor elements are connected to the contacting modules in a positive-locking manner, wherein the electric contact bars are arranged within the plug collars in an exposed manner. Alternatively, the punched conductor elements can also be clamped or pressed into contacting modules.

In the region of the contacting modules, the conductor elements are not firmly fixed to the annular base body of the connection plate, but only to fastening regions of the conductor elements, which are removed from the contacting module over elastically deformable regions of the conductor elements. Being particularly preferred, the conductor elements are fixed at their ends facing away from the contacting modules on the base body of the connection plate. For this purpose, axial staking pins are formed, for example, on the connection plate, which axially engage into corresponding holes of the conductor strips and are then plastically reshaped. Adjacent to these fastening regions, the conductor elements comprise extensions angled in the axial direction that establish the electric contact to the winding wire of the coils. By means of this, when axially placing the separately manufactured connection plate onto the wound stator base body, on the one hand, the coils can be electrically contacted by means of the axial extensions of the conductor elements. On the other hand, movable contacting modules can be provided in the radial plane for the electric connection to the electronics unit.

For the fixation of the conductor elements on the base body of the connection plate, fastening regions of the conductor elements can be connected in a positive or non-positive-locking manner to the base body of the connection plate. For this purpose, for example, the plastic of the base body can be transformed or fixed into place by means of heat input in such a way that this plastic encloses the fastening region with respect to the axial direction. This can be implemented particularly easily by means of plastic pins integrally formed on the base surface of the connection plate. Alternatively, however, a pressing-in of the fastening regions into receiving slots of the base body is also possible by means of a toothing geometry.

The fastening regions are preferably arranged in the radially outer region of the connection plate, preferably in the immediate proximity to the axial extensions toward the winding wire. If the axial extensions are designed as insulation-displacement elements for example, the axial forces occurring when contacting the winding wires can be absorbed directly adjacently to the fastening regions. In contrast, the contacting modules can preferably be arranged at the radially inner region of the connection plate so that the contacting modules on the relatively narrow ring of the connection plate do not collide with the fastening regions of the conductor elements.

Being particularly favorable, the angular portions of the conductor elements between the fastening regions and the contacting modules have a meander shape so that the conductor elements bent in the radial plane form elastic spring limbs, the angle of which can be correspondingly changed when displacing the contact modules. Thereby, the angular portion of the conductor elements can have a kink angle of 30° to approximately 180°, wherein a plurality of bends are arranged directly one after the other. Thereby, the entire assembly space in the radial plane between the inner and outer radius of the annular base body of the circuit board is optimally utilized for the spring effect of the conductor elements.

The conductor cross-section of the conductor elements in the extension direction is herein adapted to the maximumly occurring motor currents. Preferably, at least a portion of the conductor elements has a cross-section, the dimension of which in the radial plane is greater than in the axial direction. By choosing this conductor cross-section, the spring stiffness of the conductor elements can also be adjusted.

In a preferred embodiment, so-called test pads are formed on the conductor elements, which test pads are suitable for being conveniently contacted with appropriate test electrodes. This has the decisive advantage that, after the axial assembly of a bearing plate for the rotor, the test pads can be freed up so that, before the assembly of the electronics unit, the correct connection of the coils to the connection plate can be controlled via the test pads. For this purpose, the test pads have a larger area within the radial plane than the meander-shaped region of the conductor elements. In order to detect a short circuit within the conductor elements in the best way possible, the test pads are arranged directly adjacent to the contacting modules so that the meander-shaped regions of the conductor elements can also be controlled by means of the test electrodes.

To provide more area within the inner and outer radius of the connection plate for the meander-shaped regions, the conductor elements are preferably arranged in a plurality of axial planes. This allows the conductor elements of the spaced-apart radial plane to overlap with each other in the circumferential direction and in the radial direction. This makes better use of the relatively narrow assembly space of the circular ring of the connection plate by the formation of two or a plurality of radial planes for the conductor elements. In order to prevent the risk of short-circuiting between the different conductor elements, protective walls made of plastic are integrally formed on the base body of the connection plate between the nearby adjacent region of the conductor elements. These can prevent both contact of the different conductor elements within the radial plane, as well as in the axial direction when deforming the meander-shaped regions.

With the meander-shaped conductor elements according to the invention, various connections of the individual coils of the stator can be implemented. For example, a type of conductor elements can contact the contacting module via the meander-shaped region and can contact the electric winding in a single place via the axial extension, for example, by means of an insulation-displacement connection. A further type of conductor elements can, for example, simultaneously electrically connect the contacting module to two different points of the electric winding, in particular, by means of two insulation-displacement connections.

By means of this, for example, a connection of the stator can be made where exactly one contacting module with three adjacent plug collars electrically controls a single stator quarter that is electrically insulated against the rest of the stator. For this purpose, for example, three adjacent single-tooth coils are wound by means of an uninterrupted winding wire. Both the wire tip and the wire end, as well as the two connection wires between the first and second, as well as between the second and third single-tooth coil are inserted into a corresponding receiving pocket of the insulating lamella. The first type of conductor elements can now connect in each case a plug collar of the plug module to a receiving pocket of the connection wire between two through-wound coils. The other type of conductor element can connect a third plug collar of the plug module simultaneously by means of two branches to the tip and the end of this winding wire. Thus, the three adjacent single-tooth coils form three phases U, V and W and can be energized via the plug module in a type of triangular circuit. Here, for example, the conductor element with the two branches toward the two receiving pockets is arranged in the axially lower plane toward the winding. The two other conductor elements connecting the plug module to the connection wires between the coils are arranged in a radial plane axially spaced apart therefrom.

In this way, the stator can be advantageously divided into four mentioned electrical insulated regions in order to ensure maximum intrinsic safety for safety-relevant applications. For example, the stator comprises herein twelve radial stator teeth, on which a single-tooth coil is respectively wound. The stator teeth are covered herein on one side with an insulating support plate on which the winding wire is wound. In the support plate there are formed receiving pockets for the winding wire, into which receiving pockets the axial extensions of the connection plate axially engage, in particular, as insulation-displacement elements. During the formation of four intrinsically safe motor quarters, an additional receiving pocket is formed at each of the four winding wire ends, so that a total of four receiving pockets for the winding wire are formed for each of the three adjacent single-tooth coils. The four motor quarters are each controlled by a separate plug module with the three phase U, V, W. If a short circuit now occurs in one motor quarter, the other motor quarters can continue the motor operation with reduced power.

So that in the case of mounting the connection plate onto the stator base body the insulation-displacement connections are precisely aligned with one another, axial centering pins are formed on the support plate, which engage into corresponding centering receptacles in the annular base body of the connection plate. This ensures that the insulation-displacement elements of the conductor elements are precisely aligned with the receiving pockets in the support plate and form a reliable insulation-displacement connection to the inserted winding wire. For the fixation of the connection plate on the stator base body, after the axial assembly of the connection plate, the free ends of the centering pins are transformed into an axial positive-locking fit, for example, also by means of heat staking. The centering pins are herein formed, for example, roughly on the same radius with the receiving pockets on the support plate in a single piece. Accordingly, the centering receptacles of the connection plate are also formed in the radially outer region, approximately on the radius of the axial extensions of the conductor elements.

The stator according to the invention can be easily inserted into a motor housing, for example, pressed in. Axially above the connection plate there is then inserted a bearing plate into the motor housing to arrange in a rotationally movable manner the rotor radially within the stator. For example, an electronics unit is inserted into the motor housing axially above the bearing plate, wherein, in particular, the motor housing is widened from a cylindrical shape in the region of the stator base body into an approximately square cross-section in the region of the electronics unit. Thereby, the electronics unit comprises axial plugs, which preferably axially engage into the plug collars of the contacting modules as axial connection tabs. In the case of this arrangement of the electronics unit, a rotor position sensor system can be arranged above an end of the rotor shaft in a centrally axial manner, for example, a magnetic sensor, in order to control the electronic commutation of the EC motor.

In accordance with the manufacturing method of the electric machine according to the invention, the stator base body insulated with the support plate is firstly wound, preferably by means of needle windings. The stator base body is herein preferably composed of individual sheet-metal lamellae, which form an annular full cut. Depending on the choice of the connection, the individual coils can be wound in coil groups with an uninterrupted winding wire. For controlling the single-tooth coils, receiving pockets for the winding wire in the support plate are formed in each case between the coils. When placing the connection plate, its insulation-displacement elements then axially engage into the receiving pockets in order to electrically contact the winding wire by means of insulation-displacement connections. The insulation-displacement connections are connected to the contacting modules via the meander-shaped regions of the conductor elements so that these are arranged in the radial plane in an elastically movable manner. In a later production step, an electronics unit is placed axially on the stator, wherein axial connection tabs of the electronics unit axially engage into the contacting modules. In order to compensate for any manufacturing inaccuracies during this contacting, the plug modules are centered automatically when inserting the connection tabs, so that reliable contacting of the contact bars within the plug collars is guaranteed. The spring-elastic arrangement of the contacting modules across the meander-shaped regions of the conductor elements thus enables simple, reliable contacting of the electronics unit or allows a greater tolerance range in the production of the different components.

The receiving pockets preferably comprise a greater extension in the circumferential direction than in the radial direction. Thereby, the winding wire is guided from a first coil radially through the receiving pocket to the radial outer side of the stator and then radially guided again into a recess adjacent in the circumferential direction toward the inside to the next stator tooth. Thus, two adjacent coils are connected to each other by means of the connecting portion of the winding wire at the radial outer side of the insulating lamella at the shortest and most direct means.

Such a winding method is also particularly suitable for a so-called interwoven stator where the stator teeth are not axially arranged parallel to the stator axis, but run transversely to the stator axis in the circumferential direction. Such an interwoven stator is implemented, for example, by means of sheet-metal lamellae, which are each stacked on top of each other in the circumferential direction in a slightly twisted manner against each other. The individual sheet-metal lamellae together form the stator package, which comprises a return ring closed in the circumferential direction, to which the stator teeth are radially connected.

The wire tip and the wire end of the winding wire are fixed in a particularly favorable way to the radial outer side of the guide elements in such a way that they are not in contact with its interior surface after insertion into the motor housing. For this purpose, for example, catch elements are integrally formed on the radial outer side of the guide elements, into which catch elements the ends of the wire are pressed. For example, only one catch element is integrally formed on the support plate with respect to the axial direction on a first side, and two catch elements are integrally formed axially opposite on a second side, between which catch elements the winding wire is inserted. Here, the catch element is arranged on one side in the circumferential direction exactly between the two other catch elements on the axially other side so that the winding wire is clamped at the two transitions in the circumferential direction between the individual catch elements. At least one catch element extends in the radial direction further outward than the clamped winding wire, whereby the winding wire is arranged radially spaced apart from the inner wall of the motor housing, and is thus insulated.

BRIEF DESCRIPTION OF THE DRAWINGS

Exemplary embodiments of the invention are represented in the drawings and described in more detail in the following description, in which.

DETAILED DESCRIPTION

Figure 1:
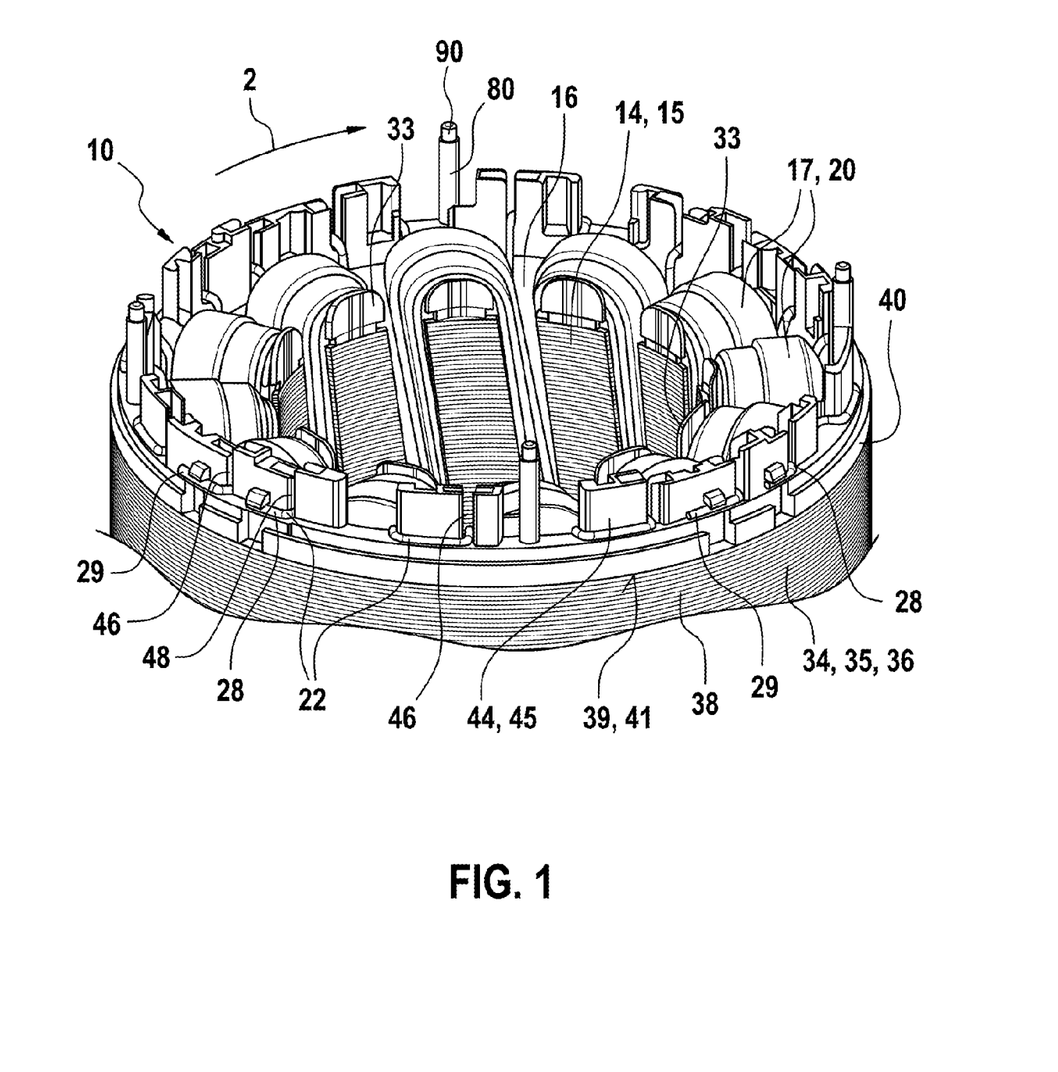
FIG. 1 shows a wound stator base body.

FIG. 1 shows a stator 10, which comprises a return ring 38 closed in the circumferential direction 2, on which radial stator teeth 14 are integrally formed for receiving coils 17 wound with winding wire 22. In this embodiment, the stator teeth 14 point radially inward so that, within the stator teeth 14, a rotor (not shown) can be stored, which is driven as an inner rotor by the stator 10. The stator 10 is composed of individual sheet-metal lamellae 36, which are stacked on top of each other in the axial direction 3 and connected to a common lamella package 35. The sheet-metal lamellae 36 are preferably punched out so that the stator teeth 14 are formed as a single piece with the return ring 38. The lamella package 35 forms the stator base body 34, which can also be formed as a single piece without sheet-metal lamellae 36 in an alternative embodiment. In FIG. 1, the individual sheet-metal lamellae 36 in the circumferential direction 2 are slightly twisted against each other so that the stator teeth 14 do not run parallel to the axial direction 3, but are formed in the circumferential direction 2 in an intertwined manner. A support plate 40 is arranged on a first axial end face 39 of the stator base body 34, which support plate preferably fully covers the end face 39 with an insulating material. Preferably, the support plate 40 is formed as a plastic injection-molded part, which is axially pressed onto the stator base body 34. The stator teeth 14 comprise a tooth head 15 at their radial ends, which is wider in the circumferential direction 2 than the actual stator tooth 14 in the radial region that is wound. The support plate 40 comprises a protrusion 33 in the region of the tooth head 15 in the axial direction 3, which protrusion holds the coil 17 on the stator tooth 14. For example, grooves are formed in the support plate 40 across the extension of the stator tooth 14 in the radial direction 4, into which grooves the winding wire 22 is inserted. Radially to the outside, the support plate 40 comprises a closed circumference 41, on which guide elements 44 are integrally formed, which lead the connecting portions 30 of the winding wire 22 between the individual coils 17. The guide elements 44 extend in the axial direction 3, wherein the winding wire 22 is guided in the radial direction 4 to the outside in order to be guided at the radial outer side 45 of the guide elements 44 in the circumferential direction 2. Furthermore, receiving pockets 46 are formed on the closed circumference 41 of the support plate 40, into which receiving pockets the winding wire 22 is inserted in order to be connected to insulation-displacement elements 70. The receiving pockets 46 comprise a greater dimension in the circumferential direction 2 than in the radial direction 4. Preferably, all receiving pockets 46 are arranged on the same radius with respect to the stator axis. As is apparent from FIG. 1, the receiving pockets 46 are preferably arranged in the region of stator grooves 16 between the stator teeth 14. In this case, each stator tooth 14 is assigned exactly one receiving pocket 46, wherein additional receiving pocket 48 for winding wire ends 28 is arranged. In FIG. 1, a winding wire is shown, which continuously forms exactly three adjacent coils 17. Thereby, a first winding wire tip 29 is inserted in the radial direction 4 into a receiving pocket 46 and a first single-tooth coil is wound around a stator tooth 14. Afterwards, the continuous winding wire 22 is inserted into the next receiving pocket and the second single-tooth coil is wound. Afterwards, the continuous winding wire 22 is inserted into the next receiving pocket 46 and the third single-tooth coil is wound. Afterwards, the winding wire 22 is inserted into the additional receiving pocket 48 so that the continuous winding wire 22 over three adjacent stator teeth 14 represents an intrinsically safe motor quarter, of which a total of four pieces are formed. Thus, in the exemplary embodiment, the stator 10 comprises twelve stator teeth 14 and twelve receiving pockets 46 and four additional receiving pockets 48 for the winding wire ends 28. The coils 17 are preferably wound by means of a nozzle of a needle winding device around the stator teeth 14. After the completed winding of a coil 17, the winding wire 22 is passed through the receiving pocket 46 radially toward the outside and is guided on a radial outer side 45 of the guide elements 44 in the circumferential direction 2 to the next stator tooth 14. Centering pins 80 are arranged on the support plate 40 in the radially outer region, which is used to receive a connection plate 52 for the coils 17.

Figure 2:
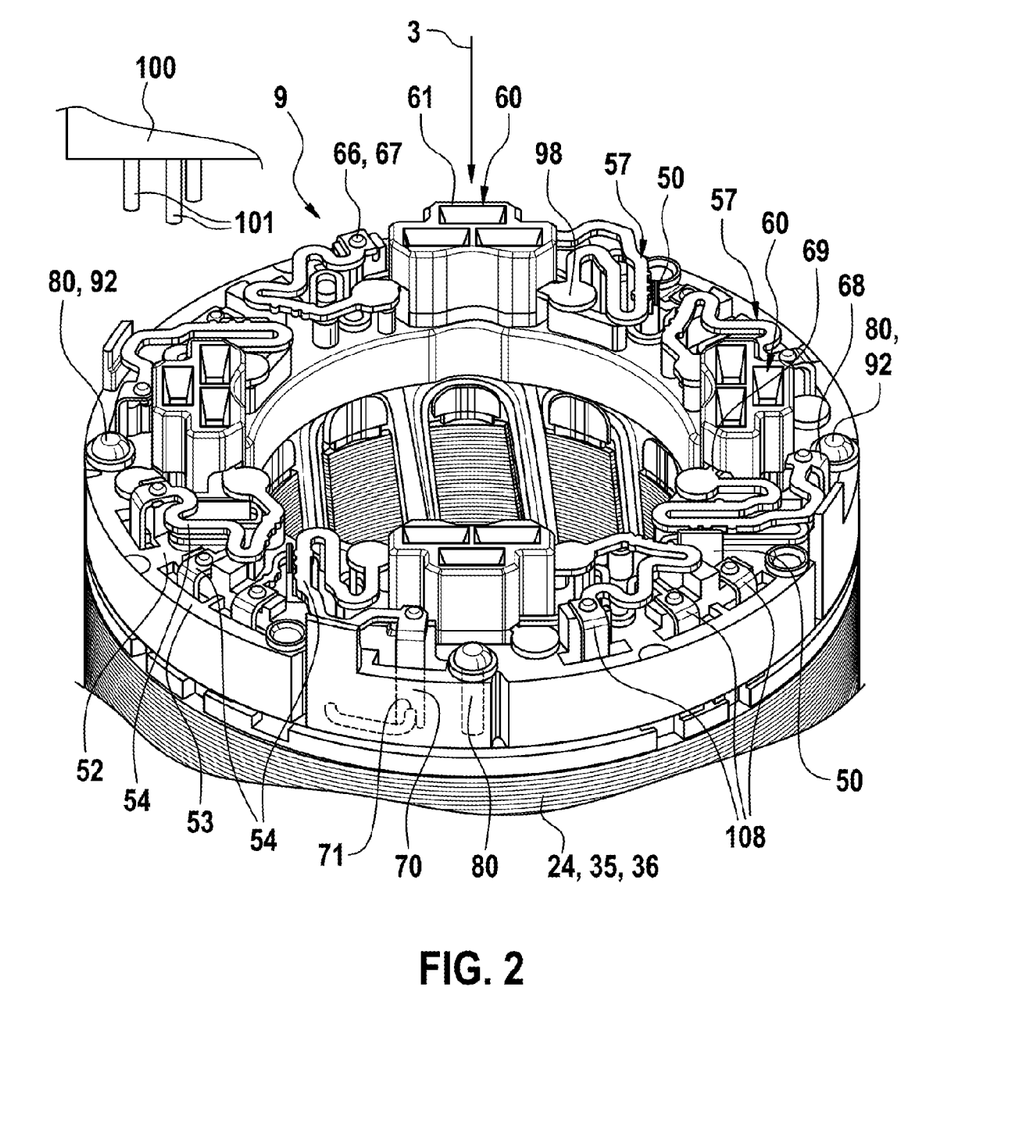
FIG. 2 shows a stator with mounted connection plate.

FIG. 2 shows a finished-wound stator on which the connection plate 52 is now placed axially. For this purpose, centering pins 80 extending axially are integrally formed as a single piece on the support plate 40, which engage into corresponding centering receptacles 81 in the connection plate 52. The centering receptacles 81 are designed as axial through holes 82. When axially joining the connection plate 52, insulation-displacement elements 70 arranged on the connection plate 52 are precisely positioned toward the receiving pockets 46 by the centering pins 80 and the centering receptacles 81 and, by means of this, the coils 17 are reliably electrically contacted. After the complete axial insertion of the centering pins 80 into the corresponding centering receptacles 81, an axial end region 90 of the centering pins 80 is plastically reshaped to form a positive-locking fit with respect to the axial direction 3. The centering pins 80 are formed here together with the support plate 40 as a plastic injection-molded part. Thus, the end regions 90 can be reshaped by means of heat staking so that at the end region 90 there is formed a pin head 92, which has a larger diameter than the centering receptacles 81. As a result, the connection plate 52 is axially reliably connected to the support plate 40.

The insulation-displacement elements 70 are arranged here on conductor elements 54, which are in an electrically insulated manner attached in the connection plate 52. The conductor elements 54 are formed here as punched and bent parts, on which the insulation-displacement elements 70 are integrally formed as a single piece. The conductor elements 54 have a meander-shaped region 57, which extends in a radial plane transverse to the stator axis. Preferably, the insulation-displacement elements 70 are axially bent in such a way that all insulation-displacement elements 70 in the radially outer region extend in the axial direction 3 toward the receiving pockets 46, 48. The insulation-displacement elements 70 have a greater width in the circumferential direction 2 than in the radial direction 4. In the middle with respect to the circumferential direction 2 there is formed a clamping slot 71 on the insulation-displacement elements 70, which is pushed via the winding wire 22 inside the receiving pocket 46, 48 while being axially joined, and thereby forms an insulation-displacement connection, which is electrically conductive. The insulation-displacement elements 70 are pressed into the receiving pockets 46, 48 in such a way that they center themselves with respect to the winding wire 22 and clamp, for example, by means of integrally formed snap hooks on the inner side of the receiving pockets 46, 48. The conductor elements 54 are connected to the connection plate 52 at their radially outer ends adjacent to the insulation-displacement elements 70 by means of material reshaping. For this purpose, staking pins 64 of the connection plate 52 engage through punched-out holes 65 in the conductor elements 54, the free ends 66 of which are reshaped into staking heads 67—in particular, by means of heat staking. Thus, all conductor elements 54 in the radially outer region 51 are immovably and firmly fixed to the connection plate 52. The meander-shaped region 57 of the conductor elements comprises a plurality of angled portions 56, which extend up to a kink angle 58 of about 180°. At the ends 69 of the conductor elements 54 opposite to the insulation-displacement elements 70 there are arranged contacting modules 60, which are not directly connected to the connection plate 52. For example, the contacting module comprises a plug collar 61 for receiving one or a plurality of connection tabs 101 of a corresponding electronics unit 100. The ends 69 of the conductor elements 54 are, for example, herein overmolded with the contact module 60 or clamped into it. Within the plug collars, the ends 69 form exposed contact bars 62, which are electrically contacted by the connection tabs 101 of the electronics unit 100.

Figure 3:
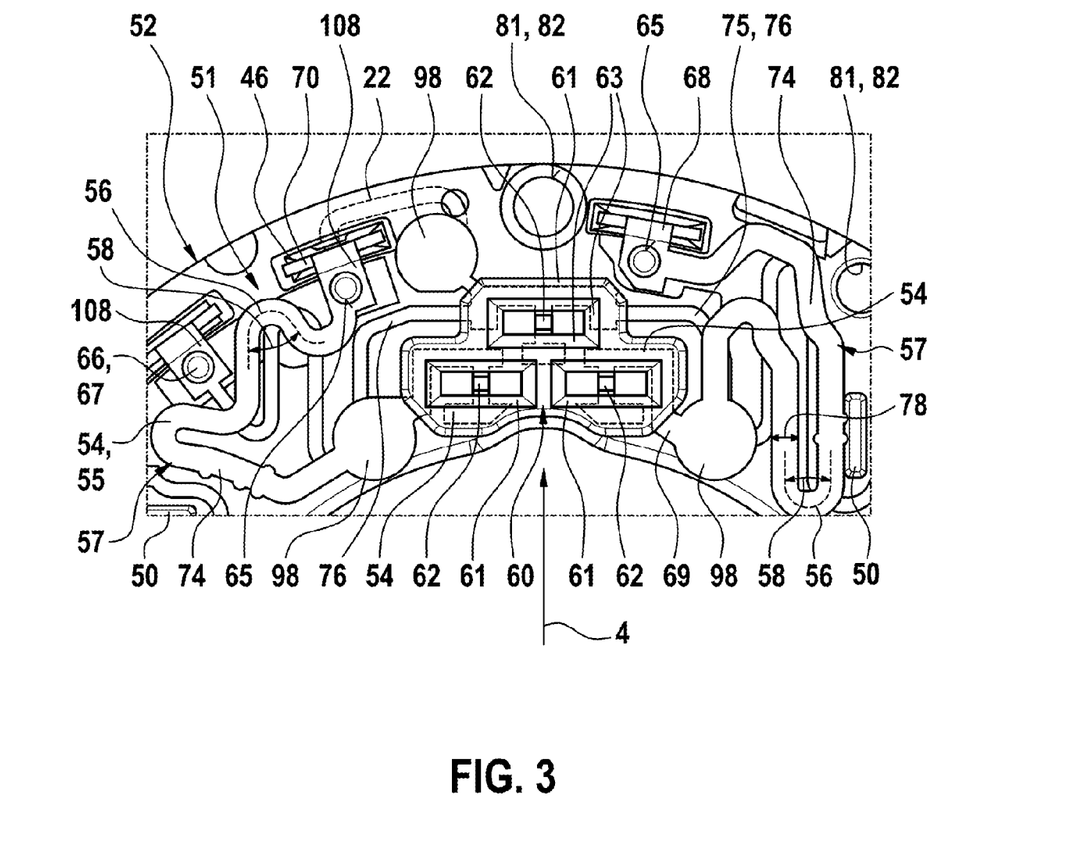
FIG. 3 shows a top view of a section of the connection plate in accordance with FIG. 2.

The contact bars 62 are illustrated in an enlarged manner in FIG. 3 for a contact module 60 with three adjacent plug collars 61. The contact bars 62 run here approximately radially to the plug collar 61, wherein they are radially enveloped on both sides of the exposed region by the plug collar 61 or are overmolded. Preferably, notches are formed on the contact tabs 101, which notches are axially pressed in via the contact bars 62 within the plug collars 61. The meander-shaped regions 57 are arranged along a radial plane between the contacting modules 60 and the insulation-displacement elements 79. Due to the plurality of angled portions 56 of each conductor element 54, the contacting modules 60 can be elastically displaced in the radial plane within certain limits. Inside the plug collars 61 there are preferably formed lead-in chamfers 63 so that the contacting modules 60 center within the radial plane by themselves when placing the connection tabs 101, wherein the contacting modules 60 are displaced in the radial plane relative to the connection plate 52 without endangering the electric connection to the coils due to this. The meander-shaped region 57 bends herein elastically, as it is made of metal as a spring-like bent/punched part. The axial forces, occurring when the connection tabs 101 are plugged, are intercepted by the contacting modules being supported in the axial direction 3 on the connection plate 52. In the exemplary embodiment, various conductor elements 52 are arranged in different radial planes axially spaced apart from each other. Thus, in an axially upper plane, two different conductor elements 74 in the circumferential direction 2 oppositely are connected to a contacting module 60, preferably each to a plug collar 61. A third conductor element 75 is arranged in an axially spaced-apart underlying radial plane and connects the third plug collar 61 to the winding wires 22 in two different receiving pockets 46, 48. Here, the two conductor elements 74 of the upper plane radially and tangentially overlap the third conductor element in the lower plane and are electrically insulated against each other by their axial spacing. The conductor elements 74 of the upper plane have a cross-section, the dimension of which is greater in the radial plane than its dimension in the axial direction 3. This increases their spring stiffness within the radial plane. In contrast, the conductor element 75 in the lower plane has a cross-section, the dimensions of which are approximately equal within the radial plane and in the axial direction 3. This conductor element 75 connects two different receiving pockets 46, 48 directly to each other and additionally to the third plug collar 61. In the case of ebb flow of this third plug collar 61, the current is distributed on both branches 76 of this third conductor element 75. The two branches 76 are preferably formed here in the circumferential direction 2 symmetrically to the third plug collar 61. In order to avoid a short circuit during the elastic displacement of the contacting modules 60, axial protective walls 50 are integrally formed at closely adjacent points of the meander-shaped regions 57 on the connection plate 52, on which walls the conductor elements 54 are optionally supported with respect to the radial plane. In this embodiment, the electric motor 9 is divided into four motor quarters insulated against each other, each with a connection module 60 with three plug collars 61. For example, three separate conductor elements 54 are arranged herein for the three phases U, V, W of a motor quarter, which are contactable via the three plug collars of a contacting module 60. The individual phases U, V, W of each motor quarter are interconnected here in a triangular circuit. In order to be able to better test the electric motor 9 electrically before setting up the electronics unit 100, test pads 98 are formed in the conductor elements, which test pads have a larger area with respect to the radial plane than a conductor width 97 of the meander-shaped region 57. In particular, the test pads 98 have a circular surface, which is easily contactable in the axial direction by means of electric test pins. The test pads 98 are integrally formed here directly adjacently to the contact modules 60.

Figure 4:
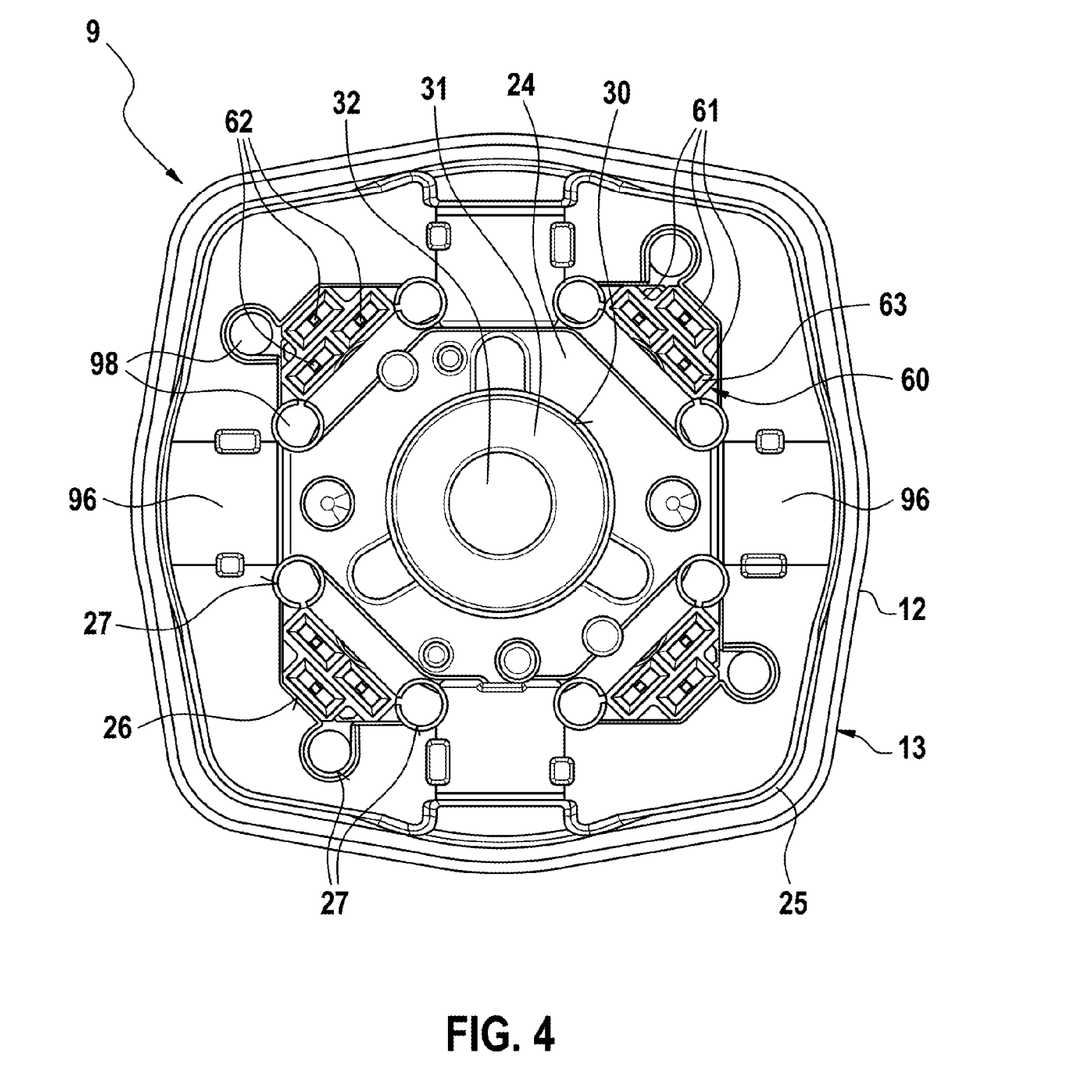
FIG. 4 shows a top view of an electric machine with mounted bearing plate.

FIG. 4 shows a stator 10, which is inserted into a motor housing 12. The motor housing 12 is cylindrically formed in the axial region of the stator base body 34 and expands axially across it into an approximate square electronic housing 13. A bearing plate 24 is inserted axially into the electronic housing 13, which bearing plate is axially attached to the housing protrusion 25. The bearing plate 24 comprises axial recesses 26, through which the contacting modules 60 are axially accessible. Similarly, in the bearing plate 24 there are formed axial recesses 27 for the test pads 98, through which the electric test pins can conveniently contact the test pads 98 before the electronics unit 100 is placed axially onto the bearing plate. The bearing plate 24 comprises a central bearing receptacle 30 for a bearing 31, which carries the rotor 32. The bearing plate is preferably made of metal. By means of this, cooling surfaces 96 can be optimally integrally formed onto the bearing plate in a targeted manner, which cooling surfaces can directly abut the electronics unit 13.

In an alternative embodiment, the stator 10 can also be designed without interweaving the stator teeth 14 so that the stator teeth 14 extend parallel to the stator longitudinal axis. In a further variant, the stator 10 can be used for an external rotor motor, in which the stator teeth 14 extend from the return ring 38 radially outward, and the rotor is arranged radially outside the stator 10.

It should be noted that in terms of the exemplary embodiments shown in the figures and in the description, a multitude of combination possibilities of the individual features with one another are possible. For example, the specific design, the arrangement and number of coils 17, as well as the design and number of receiving pockets 46, 48 can thus be varied accordingly. The position and formation of the insulation-displacement elements 70, the meander-shaped regions 57 and the contact modules 60 can also be adapted to the requirements of the electric machine 9 and the production possibilities. By means of the conductor elements 54 according to the invention, different connections can be implemented in the connection plate 52, for example, a triangular or a star circuit, wherein the individual coils 17 can be wound parallel or serially to each other. The invention is particularly suitable for the rotary drive of components or the adjustment of parts in the motor vehicle, but is not limited to this application.

The invention claimed is:

1. A stator (10) for an electric machine (9), with a stator base body (34), which comprises radial stator teeth (14) configured for receiving an electric winding (20), wherein the electric winding (20) is connected to a separately manufactured connection plate (52), which comprises contacting modules (60) configured for the energizing of individual phases (U, V, W) of the electric winding (20), wherein electric conductor elements (54) are arranged in a radial plane of the stator (10) on the connection plate (52), wherein the conductor elements (54), on the one hand, are connected to winding wires (22) of the electric winding (20) and, on the other hand, carry the contacting modules (60), and wherein the conductor elements (54) comprise, within the radial plane, a plurality of angled portions (56) that enable a spring-loaded compensation movement of the contacting modules (60) in the radial plane, characterized in that the connection plate (52) comprises an annular base body (53) made of plastic, and the contacting modules (60) are exclusively connected to the annular base body (53) via the conductor elements (54), so that the contacting modules (60) in the radial plane relative to the annular base body (53) are movable and can support themselves axially on the annular base body (53).

2. The stator (10) according to claim 1, characterized in that the contacting modules (60) are made of plastic and comprise plug collars (61) for receiving axially extending connection tabs (101) of an electronics unit (100).

3. The stator (10) according to claim 2, characterized in that the conductor elements (54) are formed as bent/punched parts (55) which protrude into the contacting modules (60) in the radial plane and within the plug collars (61) form electric contact bars (62) for the connection tabs (101) of the electronics unit (100).

4. The stator (10) according to claim 1, characterized in that the conductor elements (54) are fixed at ends (68) facing away from the contacting module (60) at fastening regions (108) in an immobile manner on the annular base body (53), and the conductor elements (54) comprise axial extensions (70) in the ends (68), which axial extensions form an insulation-displacement contact to the winding wires (22) of the electric winding (20).

5. The stator (10) according to claim 4, characterized in that the fastening regions (108) are fixed by means of plastic material reforming of the annular base body (53) thereto.

6. The stator (10) according to claim 4, characterized in that the fastening regions (108) are fixed by means of plastic material reforming of the annular base body (53) thereto, and the fastening regions (108) are arranged radially to an outside on the annular base body (53), and the contacting modules (60) are arranged radially on an inside on the annular base body (53).

7. The stator (10) according to claim 1, characterized in that the conductor elements (54) in the radial plane comprise a meander-shaped region (57).

8. The stator (10) according to claim 7, characterized in that the conductor elements (54) in the immediate vicinity of the contacting module (60) have a test pad (98), a dimension of which is greater in the radial plane than an extension (78).

9. The stator (10) according to claim 1, characterized in that the conductor elements (54) are arranged in axially spaced-apart planes and overlap each other with respect to their radial planes, wherein insulation partition walls (50) are integrally formed between conductor elements (54), where conductor elements (54) are very close in the same radial plane.

10. The stator (10) according to claim 1, characterized in that a third conductor element (75) simultaneously connects the contacting module (60) to the winding wire (22) via two different receiving pockets (46, 48), while a first and/or second conductor element (74) connects the contacting module (60) to the winding wire (22) on a single receiving pocket (46, 48).

11. The stator (10) according to claim 10, characterized in that three adjacent single-tooth coils (17) are wound on at least three adjacent stator teeth (14) with an uninterrupted winding wire (22), and a winding wire tip (29) and a winding wire end (28) are connected to the third conductor element (75).

12. The stator (10) according to claim 1, characterized in that an electrically insulating support plate (40) is arranged on the stator base body (34), on which support plate single-tooth coils (17) are wound and the winding wire (22) between the single-tooth coils (17) is inserted into receiving pockets (46, 48) for the insulation-displacement connections, which are formed in the support plate (40).

13. The stator (10) according to claim 12, characterized in that the connection plate (52) is axially mounted on the support plate (40), wherein axial extensions (70) of the conductor elements (54) axially engage into the receiving pockets (46, 48) in order to form insulation-displacement connections.

14. An electric machine (9) with a stator (10) according to claim 1, characterized in that the stator base body (34) is inserted into a motor housing (12), wherein a rotor (32) is mounted via bearing plates (24) of the motor housing (12) within the stator (10), and an electronics unit (100) for controlling the electric winding (20) is arranged axially above the connection plate (52).

15. A method for manufacturing an electric machine (9) according to claim 14, characterized by the following method steps:
   the support plate (40) is axially fitted on an end face (39) of the stator base body (34);
   single-tooth coils (17) are wound on the stator base body (34) by means of winding wire (22), wherein, after each winding of a single-tooth coil (17), the winding wire (22) is radially guided through a receiving pocket (46, 48) for the insulation-displacement connections;
   a connection plate (52) is axially inserted over the support plate (40) on the stator base body (34), in such a way that axial extensions (70) of the conductor elements (54) axially engage into the receiving pockets (46, 48) in order to electrically contact the winding wire (22);
   a bearing plate (24) is arranged axially over the connection plate (52), wherein the contacting modules (60) of the connection plate (52) remain freely accessible in the axial direction; and
   the electronics unit (100) is axially inserted over the bearing plate (24), wherein axial connection tabs (101) of the electronics unit (100) engage into the plug collars (61) of the contacting modules (60), wherein dimensional deviations in the electric contacting of the conductor elements (54) are compensated for in the radial plane due to the elastic mobility of the contacting modules (60).

16. The stator (10) according to claim 1, characterized in that the conductor elements (54) in the radial plane comprise a meander-shaped region (57) with a cross-section, an extension of which is greater in the radial plane than in an axial direction (3).

17. The stator (10) according to claim 16, characterized in that the conductor elements (54) in the immediate vicinity of the contacting module (60) have a round test pad (98), a dimension of which is greater in the radial plane than the extension (78).

18. The stator (10) according to claim 1, characterized in that the conductor elements (54) are arranged in axially spaced-apart planes and overlap each other with respect to their radial planes, wherein, at the connection plate (52), insulation partition walls (50) are integrally formed between conductor elements (54), where conductor elements (54) are very close in the same radial plane.

19. The stator (10) according to claim 1, characterized in that an electrically insulating support plate (40) is arranged on the stator base body (34), on which support plate single-tooth coils (17) are wound and the winding wire (22) between the single-tooth coils (17) is inserted into receiving pockets (46, 48) for the insulation-displacement connections, which are formed in the support plate (40) and sixteen receiving pockets (46, 48) and twelve single-tooth coils (17) are arranged, of which in each case exactly three adjacent single-tooth coils (17) are each wound with an uninterrupted winding wire (22).

20. The stator (10) according to claim 19, characterized in that the connection plate (52) is axially mounted on the support plate (40), wherein the axial extensions (70) of the conductor elements (54) axially engage into the receiving pockets (46, 48) in order to form insulation-displacement connections, and axial centering pins (80) are formed on the support plate (40), which centering pins engage into corresponding centering receptacles (81) of the conductor elements (54), and, by means of plastic material reforming, form a positive-locking fit with each other.

21. A stator (10) for an electric machine (9), with a stator base body (34), which comprises radial stator teeth (14) configured for receiving an electric winding (20), wherein the electric winding (20) is connected to a separately manufactured connection plate (52), which comprises contacting modules (60) configured for the energizing of individual phases (U, V, W) of the electric winding (20), wherein electric conductor elements (54) are arranged in a radial plane of the stator (10) on the connection plate (52), wherein the conductor elements (54), on the one hand, are connected to winding wires (22) of the electric winding (20) and, on the other hand, carry the contacting modules (60), and wherein the conductor elements (54) comprise, within the radial plane, a plurality of angled portions (56) that enable a spring-loaded compensation movement of the contacting modules (60) in the radial plane, characterized in that a third conductor element (75) simultaneously connects the contacting module (60) to the winding wire (22) via two different receiving pockets (46, 48), while a first and/or second conductor element (74) connects the contacting module (60) to the winding wire (22) on a single receiving pocket (46, 48).

22. The stator (10) according to claim 21, characterized in that three adjacent single-tooth coils (17) are wound on at least three adjacent stator teeth (14) with an uninterrupted winding wire (22), and a winding wire tip (29) and a winding wire end (28) are connected to the third conductor element (75).

23. A stator (10) for an electric machine (9), with a stator base body (34), which comprises radial stator teeth (14) configured for receiving an electric winding (20), wherein the electric winding (20) is connected to a separately manufactured connection plate (52), which comprises contacting modules (60) configured for the energizing of individual phases (U, V, W) of the electric winding (20), wherein electric conductor elements (54) are arranged in a radial plane of the stator (10) on the connection plate (52), wherein the conductor elements (54), on the one hand, are connected to winding wires (22) of the electric winding (20) and, on the other hand, carry the contacting modules (60), and wherein the conductor elements (54) comprise, within the radial plane, a plurality of angled portions (56) that enable a spring-loaded compensation movement of the contacting modules (60) in the radial plane, characterized in that an electrically insulating support plate (40) is arranged on the stator base body (34), on which support plate single-tooth coils (17) are wound and the winding wire (22) between the single-tooth coils (17) is inserted into receiving pockets (46, 48) for the insulation-displacement connections, which are formed in the support plate (40), wherein the connection plate (52) is axially mounted on the support plate (40), wherein axial extensions (70) of the conductor elements (54) axially engage into the receiving pockets (46, 48) in order to form insulation-displacement connections.

24. A stator (10) for an electric machine (9), with a stator base body (34), which comprises radial stator teeth (14) configured for receiving an electric winding (20), wherein the electric winding (20) is connected to a separately manufactured connection plate (52), which comprises contacting modules (60) configured for the energizing of individual phases (U, V, W) of the electric winding (20), wherein electric conductor elements (54) are arranged in a radial plane of the stator (10) on the connection plate (52), wherein the conductor elements (54), on the one hand, are connected to winding wires (22) of the electric winding (20) and, on the other hand, carry the contacting modules (60), and wherein the conductor elements (54) comprise, within the radial plane, a plurality of angled portions (56) that enable a spring-loaded compensation movement of the contacting modules (60) in the radial plane, characterized in that an electrically insulating support plate (40) is arranged on the stator base body (34), on which support plate single-tooth coils (17) are wound and the winding wire (22) between the single-tooth coils (17) is inserted into receiving pockets (46, 48) for the insulation-displacement connections, which are formed in the support plate (40) and sixteen receiving pockets (46, 48) and twelve single-tooth coils (17) are arranged, of which in each case exactly three adjacent single-tooth coils (17) are each wound with an uninterrupted winding wire (22).

25. The stator (10) according to claim 24, characterized in that the connection plate (52) is axially mounted on the support plate (40), wherein the axial extensions (70) of the conductor elements (54) axially engage into the receiving pockets (46, 48) in order to form insulation-displacement connections, and axial centering pins (80) are formed on the support plate (40), which centering pins engage into corresponding centering receptacles (81) of the conductor elements (54), and, by means of plastic material reforming, form a positive-locking fit with each other.

\* \* \* \* \*